J. E. BOETTCHER.
MEASURING APPARATUS.
APPLICATION FILED DEC. 29, 1919.
1,373,049. Patented Mar. 29, 1921.
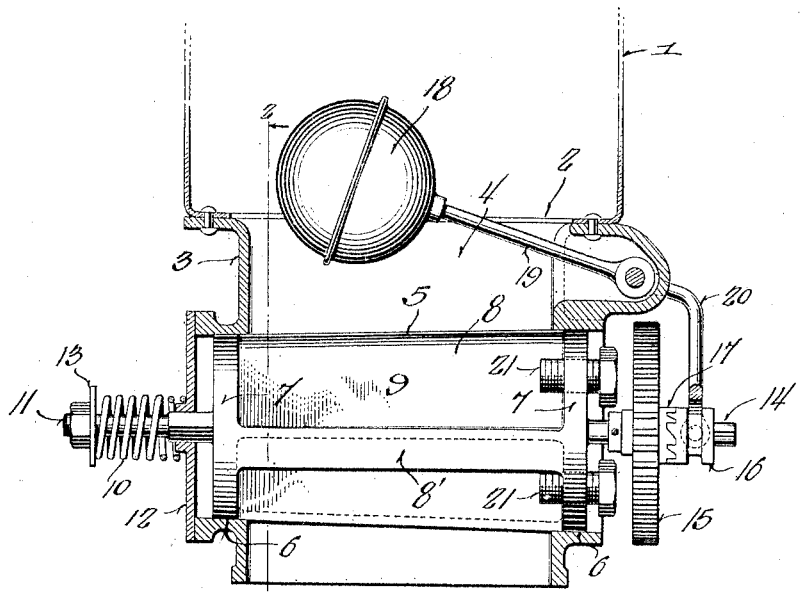
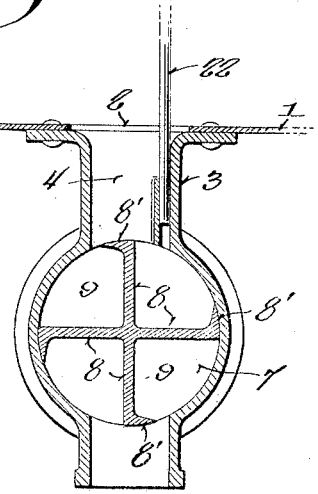
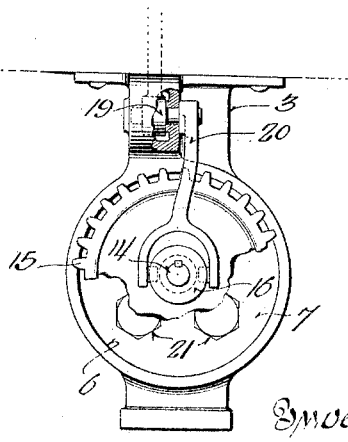
Inventor
John E. Boettcher

UNITED STATES PATENT OFFICE.

JOHN E. BOETTCHER, OF MADISON, WISCONSIN.

MEASURING APPARATUS.

1,373,049.　　　　Specification of Letters Patent.　　Patented Mar. 29, 1921.

Application filed December 29, 1919. Serial No. 347,920.

*To all whom it may concern:*

Be it known that I, JOHN E. BOETTCHER, a citizen of the United States, and resident of Madison, in the county of Dane and State of Wisconsin, have invented certain new and useful Improvements in Measuring Apparatus; and I do hereby declare that the following is a full, clear, and exact description thereof.

My invention relates to new and useful improvements in measuring machines, particularly those for measuring liquids.

One important object of the invention is to provide an apparatus which can be readily associated with any suitable sort of container by means of which predetermined quantities of liquid or finely divided dry materials may be continuously delivered at a uniform rate.

An additional object is to provide a rotary measuring device which may be continuously and effectively actuated by any suitable hand or power means.

A further object is to provide an arrangement for automatically discontinuing actuation of the measuring device when the quantity of material in the container to which the invention is applied reaches a predetermined low level.

With these and other objects in view, the invention resides in certain novel features of construction, combination and arrangement of parts which will be hereinafter more particularly described and claimed and shown in the drawing wherein:

Figure 1 represents a central vertical section through an apparatus constructed in accordance with my invention.

Fig. 2 is a vertical transverse sectional view taken on the plane of the line 2—2 of Fig. 1, and Fig. 3 is an end view with parts broken away and in section.

The materials or liquids which this invention is designed to measure and dispense are fed to the apparatus by gravity, preferably, being contained in a tank or bin 1 having an outlet opening 2 in its bottom. The parts of the invention are compactly arranged and the measuring element thereof is disposed in a housing 3, bolted or otherwise secured to the bottom of the container 1 and in the path of flow through the opening 2. The housing is provided with a vertical passageway 4 terminating in a discharge outlet at its lower end.

A rotary measuring member 5 is positioned transversely of the passageway 4 and is journaled in bearing openings 6 formed in the opposite end walls of the housing. The measuring member 5 comprises a pair of bearing disks 7, one of which is journaled in each of the bearing openings 6, and a plurality of radial ribs 8 which extend longitudinally of the member and have their opposite ends formed integrally with or otherwise connected with the bearing disks 7. From Fig. 2 it will be noted that the adjacent ribs 8 form pockets 9 to receive the liquid to be measured, and that the depicted embodiment contains four pockets of equal size formed by positioning the ribs at right angles to each other. By providing an additional number of ribs and locating the same at other than right angles, more pockets may be formed in the member. The outer longitudinal edge of each of the ribs 8 is provided with a lip 8' extending in the direction of rotation of the measuring member to increase the retaining efficiency of the pockets and to provide an increased bearing surface between the intermediate portions of the member and the arcuate side walls of the housing 3.

One of the bearing openings 6 is smaller than the other which is also the case of the disks 7, and the measuring member is tapered to compensate for wear between it and the surfaces with which it contacts. The member 5 is continuously urged into antileaking engagement with the side walls of the housing 3 and the bearing openings 6 by an expansile coil spring 10 disposed around a stem 11 that extends axially from the smaller bearing disk 7. One end of this spring bears against an end plate 12 disposed over the end of the smaller bearing opening and the other end contacts with an adjustable nut and washer 13 threaded on the outer end of the stem.

The other or larger bearing disk 7 has an outwardly and axially extending stub shaft 14 on which is loosely journaled a spur gear 15 and to which is slidably splined a sliding clutch element 16. The gear carries a coöperating clutch element 17, the teeth of the two elements being adapted to interlock to fix the gear to the stub shaft and consequently to the rotary measuring member 5. The spur gear is connected with any suitable sort of driving gear which may be either manually or mechanically operated.

Under normal conditions, that is to say when the container 1 is more or less full, the clutch elements engage to lock the gear wheel to the stub shaft and cause a continuous rotation of the measuring member 5. When, however, the liquid in the tank 1 reaches a predetermined low level, a float 18 therein will lower and cause the sliding clutch element to be shifted outwardly of the stud shaft and away from the other clutch element 17. The corresponding movements of the sliding clutch element and the float is obtained through an intermediately pivoted float rod 19 and a clutch shifter arm 20.

Since this apparatus is designed for accurate measuring it is essential that each of the pockets 9 be of exactly the same size to receive the same quantity of the material being engaged. For this reason a displacement plug 21 is threaded through the larger bearing disk 7 and into each of the pockets. As shown in Fig. 1 these plugs 21 may be in the nature of ordinary screws or bolts having one portion disposed in the pockets and adjustably secured in the bearing disk 7.

Assuming that gasolene is to be measured and dispensed by my invention, the tank 1 is filled therewith, thus causing the float 18 to rise and engage the coöperating teeth of the clutch elements 16 and 17. The spur gear 15 being rotated, the rotary measuring member 5 will be likewise rotated to successively bring the open portion of each of the pockets 9 into alinement with the portion of the passageway 4 thereabove, and a subsequent movement of the pockets, filled by the gasolene flowing into said passageway 4 from the opening 2, disposes them in an inverted position and in alinement with the discharge end of said passageway 4. The pockets 9 will thus be continuously and successively filled when directly below the upper portion of the passageway 4, and emptied when over and in communication with the discharge portion of said passageway. The several pockets being of the same capacity, like amounts of gasolene will be delivered through the discharge part of the passageway 4 at a uniform rate of flow, and this will continue so long as the measuring member is revolved or as long as the float is retained in raised position.

A relief standpipe 22 extends into the passageway 4 and terminates adjacent the upper portion of one of the bearing openings 6 as is clearly shown in Fig. 2. By this or some similar arrangement, the air which is trapped in each of the pockets 9 as the same are moved from discharging position to filling position may escape simultaneously with the flow of liquid or other material from the passageway 4 into the pocket which is in registration therewith.

Various minor changes may be made in the form and proportion of the several parts of the invention without departing from or sacrificing any of the principles as outlined in the following claim.

I claim:

The combination with a receptacle having an outlet opening, of a plurality of measuring devices successively registrable with the outlet opening to receive a portion of the contents of the receptacle, clutch controlled means for shifting the measuring devices to procure said registration, and a float in the receptacle and connected with last mentioned means to automatically discontinue shifting of the measuring devices when the contents of said receptacle attains a predetermined low level.

In testimony that I claim the foregoing I have hereunto set my hand at Milwaukee, in the county of Milwaukee and State of Wisconsin.

JOHN E. BOETTCHER.